(12) United States Patent
Furukawa

(10) Patent No.: US 9,028,307 B2
(45) Date of Patent: May 12, 2015

(54) REGISTER FOR AIR-CONDITIONING

(75) Inventor: Yusaku Furukawa, Aichi (JP)

(73) Assignee: Toyota Shatai Kabushiki Kaisha, Kariya-shi (JP)

( * ) Notice: Subject to any disclaimer, the term of this patent is extended or adjusted under 35 U.S.C. 154(b) by 864 days.

(21) Appl. No.: 13/147,740

(22) PCT Filed: Jun. 18, 2009

(86) PCT No.: PCT/JP2009/061101
§ 371 (c)(1),
(2), (4) Date: Aug. 3, 2011

(87) PCT Pub. No.: WO2010/100774
PCT Pub. Date: Sep. 10, 2010

(65) Prior Publication Data
US 2011/0294410 A1    Dec. 1, 2011

(30) Foreign Application Priority Data
Mar. 5, 2009    (JP) .................................. 2009-051806

(51) Int. Cl.
*B60H 1/34*    (2006.01)

(52) U.S. Cl.
CPC ............ *B60H 1/3407* (2013.01); *B60H 1/3421* (2013.01); *B60H 2001/3492* (2013.01)

(58) Field of Classification Search
CPC ...... B60H 1/3421; B60H 1/3407; B60H 1/34; B60H 2001/2492; F24F 11/0011; E06B 9/386
USPC .......................... 454/152, 153, 155, 156, 162
See application file for complete search history.

(56) References Cited

U.S. PATENT DOCUMENTS

| | | | |
|---|---|---|---|
| 6,974,377 B2 * | 12/2005 | Gehring et al. | ................ 454/152 |
| 2006/0162212 A1 * | 7/2006 | Kim et al. | ........................ 40/725 |

FOREIGN PATENT DOCUMENTS

| | | | | |
|---|---|---|---|---|
| DE | 202008008877 U1 * | 4/2009 | ............... | B60H 1/34 |
| JP | 6 58616 | 3/1994 | | |

(Continued)

OTHER PUBLICATIONS

Kunststoffwerke, English Machine Translation of DE202008008877U1, Apr. 2009.*
Japanese Notification of Reasons for Refusal issued Nov. 13, 2012, in Japan Patent Application No. 2009-051806 (with English translation).

(Continued)

*Primary Examiner* — Gregory Huson
*Assistant Examiner* — Dana Tighe
(74) *Attorney, Agent, or Firm* — Oblon, McClelland, Maier & Neustadt, L.L.P.

(57) ABSTRACT

A register for air-conditioning includes a tubular register having an air passage and a blowoff opening and register fins 2 for regulating the wind direction of conditioned air blowing out from the blowoff opening. The register fin 2 includes a plate-like fin main body 3 and a pair of plate-like fin covers 4 and 5 assembled so as to sandwich the fin main body 3 from both sides of the fin main body 3 with the end face of the fin main body 3 on the vehicle cabin side being exposed. The fin main body 3 is provided with a plurality of engaging holes 31. The fin covers 4 and 5 are provided, at the positions corresponding to the engaging holes 31, with a plurality of engaging claws (41) and 51 protruding in the thickness direction from the surfaces facing the fin main body 3. The fin main body 3 and the fin covers 4 and 5 are assembled by engaging the engaging holes 31 with the engaging claws (41) and 51.

7 Claims, 8 Drawing Sheets

(56) References Cited

FOREIGN PATENT DOCUMENTS

| JP | 3129645 | 2/2007 |
| JP | 2008 37376 | 2/2008 |

OTHER PUBLICATIONS

International Search Report issued Jul. 14, 2009 in PCT/JP09/061101 filed Jun. 18, 2009.

* cited by examiner

REGISTER FOR AIR-CONDITIONING

TECHNICAL FIELD

This invention relates to a register for air-conditioning forming an air outlet through which temperature-controlled air is blown into a vehicle cabin.

BACKGROUND ART

Conventionally, in a motor vehicle or the like, a register for air-conditioning for blowing temperature-controlled air (hereinafter referred to as conditioned air) into a vehicle cabin through a blowoff opening has been known (see Patent Document 1).

This register for air-conditioning is provided, at the blowoff opening, with a plurality of register fins which regulate a direction of the conditioned air. Generally, the register fins are integrally formed as a plate-like molded article made of resin or the like.

RELATED ART DOCUMENT

Patent Document

Patent Document 1 JP2008-37376A

SUMMARY OF THE INVENTION

Problem to be Solved by the Invention

The register fins may be decorated in order to increase the design quality. Decorating can be done by plating or painting on entire register fins, for example. However, in the case of partial decoration of the register fins, for example, in the case of decorating only a portion of the register fins, facing the vehicle cabin where the design quality is requested most, it was very difficult to plate or paint only the portions to be decorated while the portions not to be decorated are masked, because the register fins are plate-like small members. That is, conventionally, it was possible to decorate the entire register fins, but difficult to partially decorate the register fins.

The present invention has been made in view of the above problem and provides a register for air-conditioning having a simple structure and allowing the register fins to be partially decorated.

Means for Solving the Problem

The present invention relates to a register for air-conditioning, which includes:

a register main body in tubular shape having an air passage through which conditioned air is passed and a blowoff opening which is open toward a vehicle cabin at a downstream end of the air passage and blows the conditioned air; and at least one register fin disposed at the blowoff opening to regulate a wind direction of the conditioned air blowing out from the blowoff opening, wherein at least one of the register fins includes a plate-like fin main body and a pair of plate-like fin covers assembled so as to sandwich the fin main body from both sides with an end face of the fin main body on the vehicle cabin side being exposed, the fin main body includes a plurality of engaging holes formed in a thickness direction of the fin main body, the fin covers include a plurality of engaging claws provided at the positions corresponding to the engaging holes and protruding in a thickness direction from the surfaces facing the fin main body, and the fin main body and the fin covers are assembled by engaging the engaging holes and the engaging claws.

Effects of the Invention

In the register for air-conditioning according to the present invention, the register fin is formed of the plate-like fin main body and the pair of plate-like fin covers assembled so as to sandwich the fin main body from both sides with the end face of the fin main body on the vehicle cabin side being exposed.

In other words, the register fin is not a conventional one-piece unit but an assembly of a plurality of parts. The portion of the fin main body, facing the vehicle cabin is exposed and the other portions are covered with the fin covers.

Therefore, the entire fin main body can be plated or painted without masking and then the fin covers can be assembled to the fin main body with the portion facing the vehicle cabin (front edge 303) being exposed. It enables to obtain the register fin having a high design quality, in which only the portion facing the vehicle cabin where the design quality is requested most is decorated by plating or painting. In this way, the register fin can be partially decorated.

In addition, the fin main body and the fin covers forming the register fin are configured to be assembled by engaging the engaging holes and the engaging claws disposed thereon respectively. Therefore, the fin main body and the fin covers can be easily and surely assembled in a simple structure without the use of glue, adhesive tape or the like. This also results in reduction of production cost.

As described above, the present invention provides a register for air-conditioning having a simple structure and allowing the register fins to be partially decorated.

MODE FOR CARRYING OUT THE INVENTION

Figure 1:
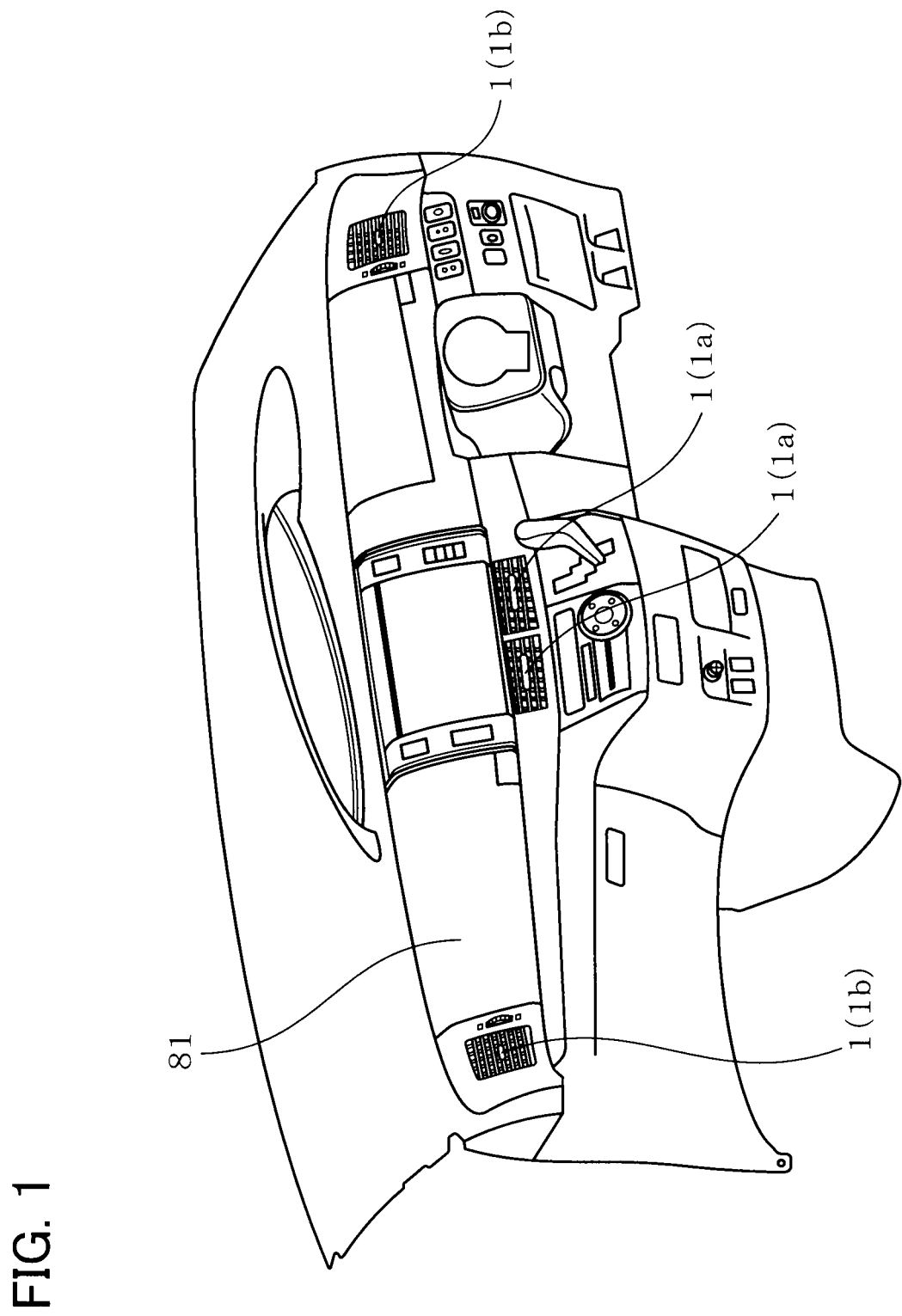
FIG. 1 is an illustration showing the disposition of a register for air-conditioning according to an embodiment.

In the present invention, the register for air-conditioning forms an air outlet for blowing temperature-controlled air into a vehicle cabin. The register for air-conditioning can be applied to a center register disposed in the center of an instrument panel or to side registers disposed on the right and left sides, for example.

The register fin can also be applied, at the blowoff opening of the register for air-conditioning, to a vertical fin which is vertically disposed or to a horizontal fin which is horizontally disposed.

In addition, when a register fin regulating one of the vertical and horizontal wind directions, and a register fin regulating the other wing direction are provided as the register fins of the register for air-conditioning, it is preferable to apply the register fin of the present invention, which is formed of the fin main body and the pair of fin covers covering it, for the register fin disposed on the downstream side, that is, the register fin disposed on the vehicle cabin side.

In this case, the register fin disposed on the vehicle cabin side (the portion facing the vehicle cabin side) can be partially decorated, thereby improving the overall design quality of the inside of vehicle cabin including the instrument panel on which the air conditioning register fin is disposed.

Preferably, the engaging hole includes an engaging protrusion protruding from the inner wall surface thereof, the engaging claw includes an engaging concave portion recessed inward from the outer surface of the engaging claw at the position corresponding to the engaging protrusion, and the fin main body and the fin covers are assembled by engaging the engaging protrusions of the engaging holes with the engaging concave portions of the engaging claws.

In this case, the engaging holes and the engaging claws are surely engaged. As a result, the fin covers can be fully and surely assembled to the fin main body.

In addition, it is preferable that the fin main body and the fin covers are configured to be assembled by inserting the engaging claws in the engaging holes and sliding the fin covers on the surface of the fin main body to engage the engaging protrusions of the engaging holes with the engaging concave portions of the engaging claws.

In this case, the fin covers can be easily assembled to the fin main body.

Furthermore, it is preferable that the fin main body includes locating concave portions recessed in a thickness direction from the surfaces facing the fin covers and stopper concave portions located forward than the locating concave portions in a sliding direction of the fin covers, the fin cover includes position control projecting portions which project in a thickness direction from the surface facing the fin main body, and the fin main body and the fin covers are configured so that the position control projecting portions are positioned within the locating concave portions, thereby inserting the engaging claws in the engaging holes and positioning the longitudinal direction of the fin covers with respect to the fin main body, and further, the fin covers are slid in the cross direction on the surface of the fin main body and the position control projecting portions are moved from the inside of the locating concave portions to the inside of the stopper concave portions, thereby engaging the engaging protrusions of the engaging holes with the engaging concave portions of the engaging claws and restricting movement of the fin covers in the sliding direction.

In this case, during the assembly, the fin covers can be easily positioned with respect to the fin main body. After the assembly, the assembly position of the fin covers with respect to the fin main body can be surely held.

Embodiments

The register for air-conditioning according to one embodiment of the present invention will be described with reference to the accompanying drawings.

Figure 2:
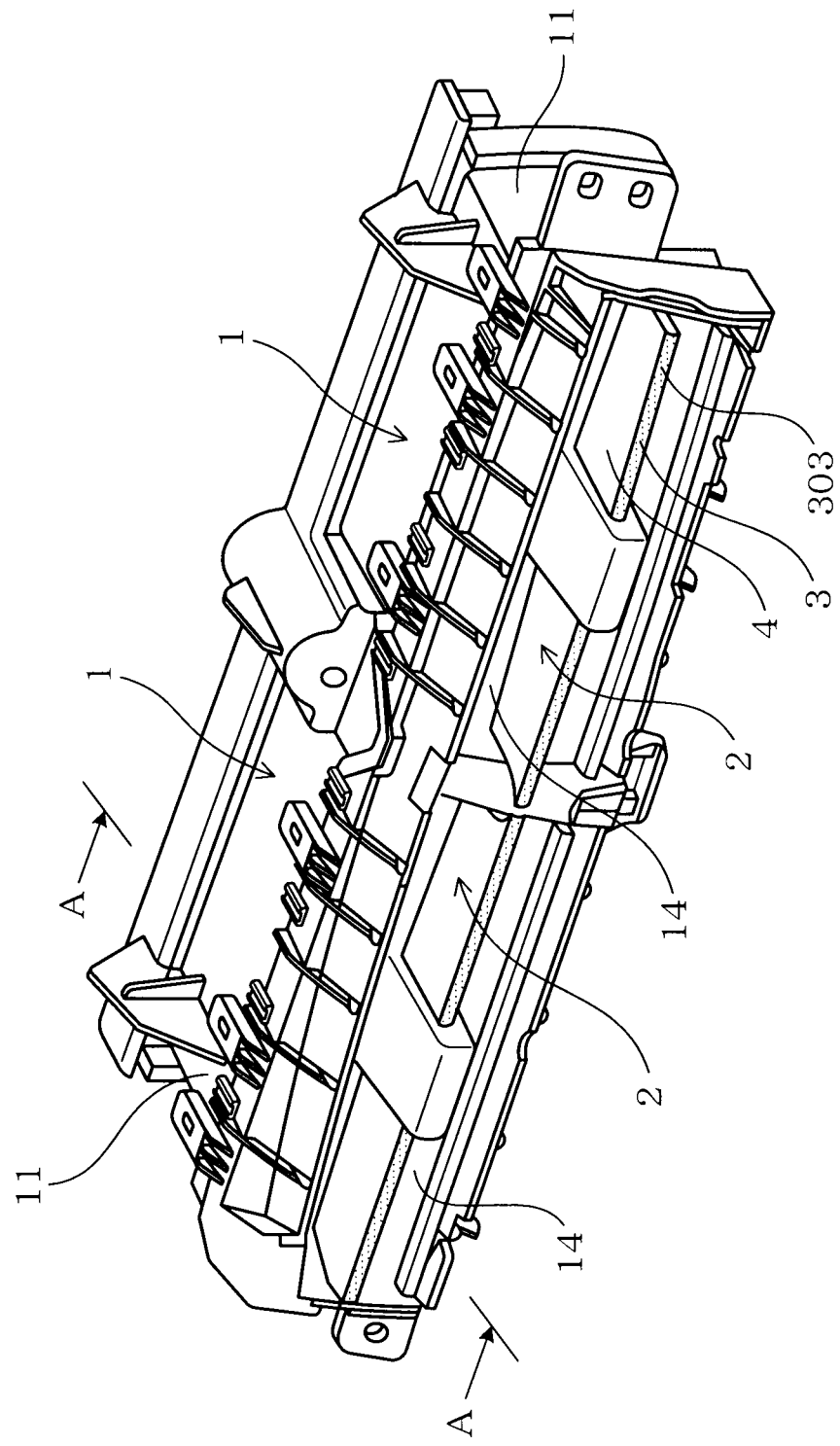
FIG. 2 is an illustration showing the register for air-conditioning according to the embodiment.
Figure 3:
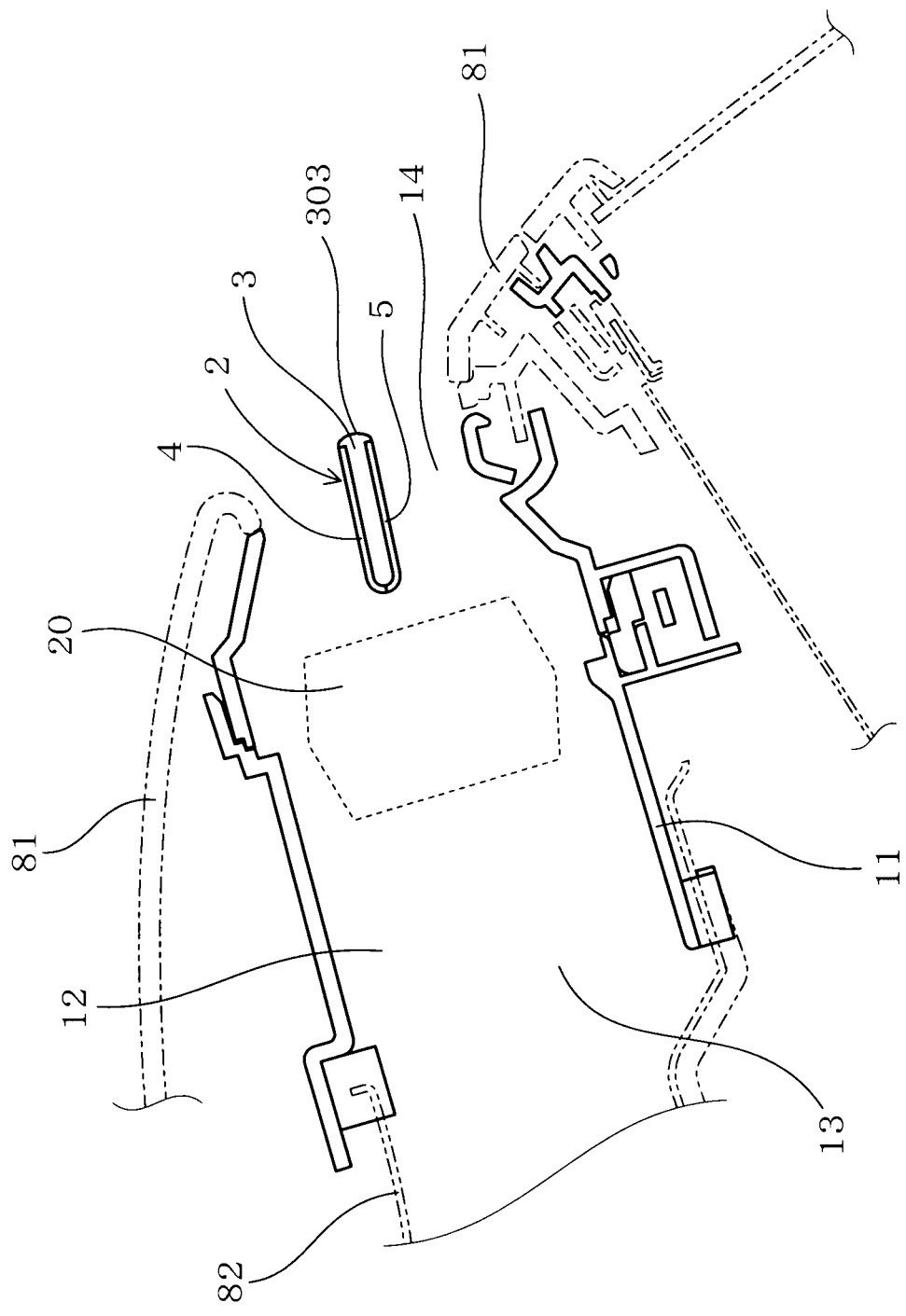
FIG. 3 is a cross-section view taken along lines A-A of FIG. 2.

The register for air-conditioning 1 of the embodiment, as shown in FIGS. 1 to 3, includes a register main body in tubular shape 11 having an air passage 12 through which conditioned air is passed and a blowoff opening 14 which is open toward a vehicle cabin at a downstream end of the air passage 12 and blows the conditioned air, and at least one register fin 2 disposed at the blowoff opening 14 to regulate a wind direction of the conditioned air blowing out from the blowoff opening 14.

Figure 4:
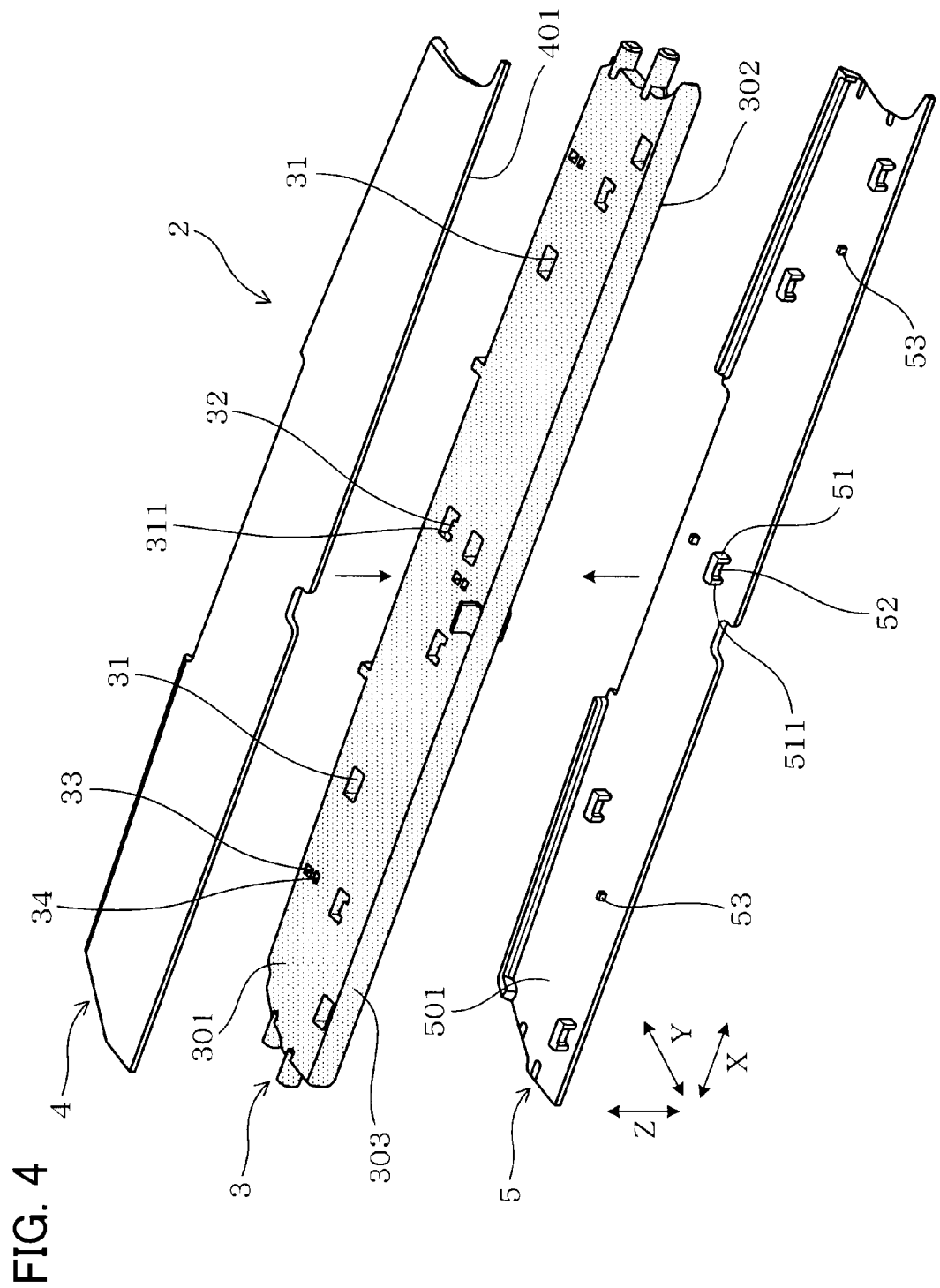
FIG. 4 is a developed perspective view showing parts forming the register fin in the register according to the embodiment.

As shown in FIG. 4, the register fin 2 disposed at the downstream end of the blowoff opening 14 is formed of a plate-like fin main body 3 and a pair of plate-like fin covers 4 and 5 assembled so as to sandwich the fin main body 3 from both sides with the end face (front edge 303) on the vehicle cabin side of the fin main body 3 being exposed.

As shown in FIGS. 5 to 8, the fin main body 3 is provided with a plurality of engaging holes 31 formed in the thickness direction Z of the fin main body 3, and the fin covers 4 and 5 are provided, at the positions corresponding to the engaging holes 31, with a plurality of engaging claws 41 and 51 protruding in the thickness direction Z from the surfaces (opposed surfaces 401 and 501) facing the fin main body 3. The fin main body 3 and the fin covers 4 and 5 are assembled by engaging the engaging holes 31 and the engaging claws 41 and 51.

Hereinafter, the above embodiment will be described in detail.

As shown in FIG. 1, the register for air-conditioning 1 is assembled to the instrument panel 81 and is configured so as to blow out the conditioned air sent from the air conditioning duct 82 (see FIG. 3) into the vehicle cabin.

In this embodiment, among the center register 1*a* which is a register for air-conditioning disposed in the center of the instrument panel 81 and the side registers 1*b* which are registers for air-conditioning disposed on the right and left sides, the center register 1*a* is described.

As shown in FIGS. 2 and 3, the register for air-conditioning 1 is provided with a tubular register main body 11. The inside of the register main body 11 forms an air passage 12 through which the conditioned air passes. The register main body 11 has a connecting port 13 at the upstream end of the air passage 12, which is connected to the air-conditioning duct 82, and a blowoff opening 14 at the downstream end of the air passage 12, which is open toward the vehicle cabin side and blows the conditioned air.

As shown in the same drawings, one register fin 2 which is exposed to the vehicle cabin side is disposed at the blowoff opening 14 of the register main body 11. The register fin 2 is a horizontal fin disposed in a horizontal direction. The register fin 2 is configured to be rotatable in a vertical direction, so that the vertical wind direction of the conditioned air blowing out from the blowoff opening 14 can be regulated.

As shown in FIG. 3, immediately upstream of the register fin 2 exposed to the vehicle cabin side, a plurality of register fins (hereinafter referred to as upstream side fins in order to differentiate them from the register fins 2 located downstream and exposed to the vehicle cabin side) 20 are disposed in the horizontal direction. The upstream side fins 20 are vertical fins disposed in a vertical direction. The upstream side fins 20 are configured to be rotatable in the horizontal direction, so that the horizontal wind direction of the conditioned air blowing out from the blowoff opening 14 can be regulated.

As shown in FIG. 4, the register fin 2 is formed of a plate-like fin main body 3 and a pair of plate-like fin covers 4 and 5 assembled so as to sandwich the fin main body 3 from both sides with an end face (front edge 303) of the fin main body 3 on the vehicle cabin side being exposed. The pair of fin covers 4 and 5 consists of a first fin cover 4 which covers a first surface side 301 of the fin main body 3 and a second fin cover 5 which covers a second surface side 302.

According to this embodiment, only the fin main body 3 among the parts constituting the register fin 2 is decorated by painting the entire body with silver paint.

Figure 5:
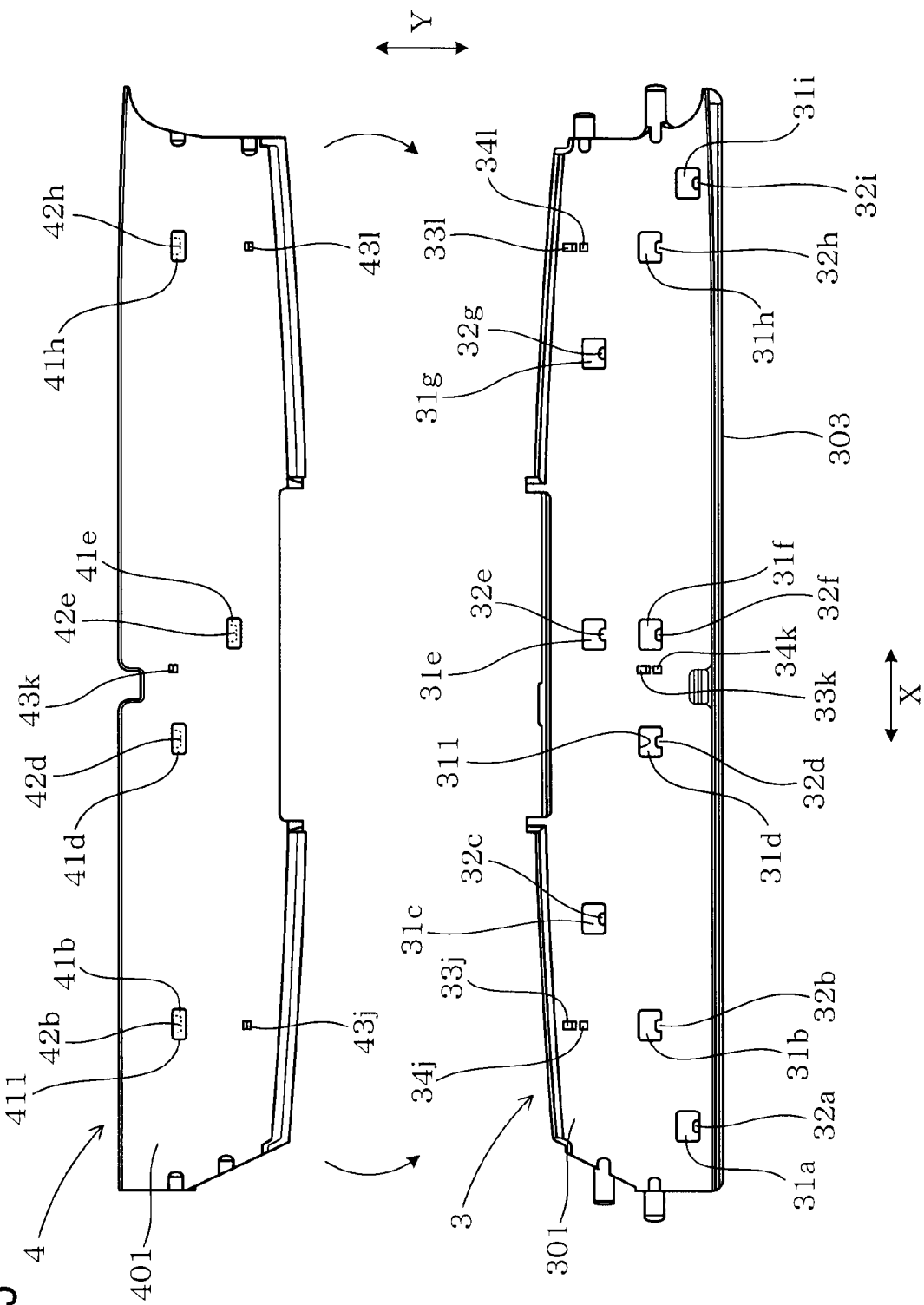
FIG. 5 is an illustration showing a first surface of a fin main body and an opposed surface of a first fin cover covering the first surface of the fin main body in the register according to the embodiment.
Figure 6:
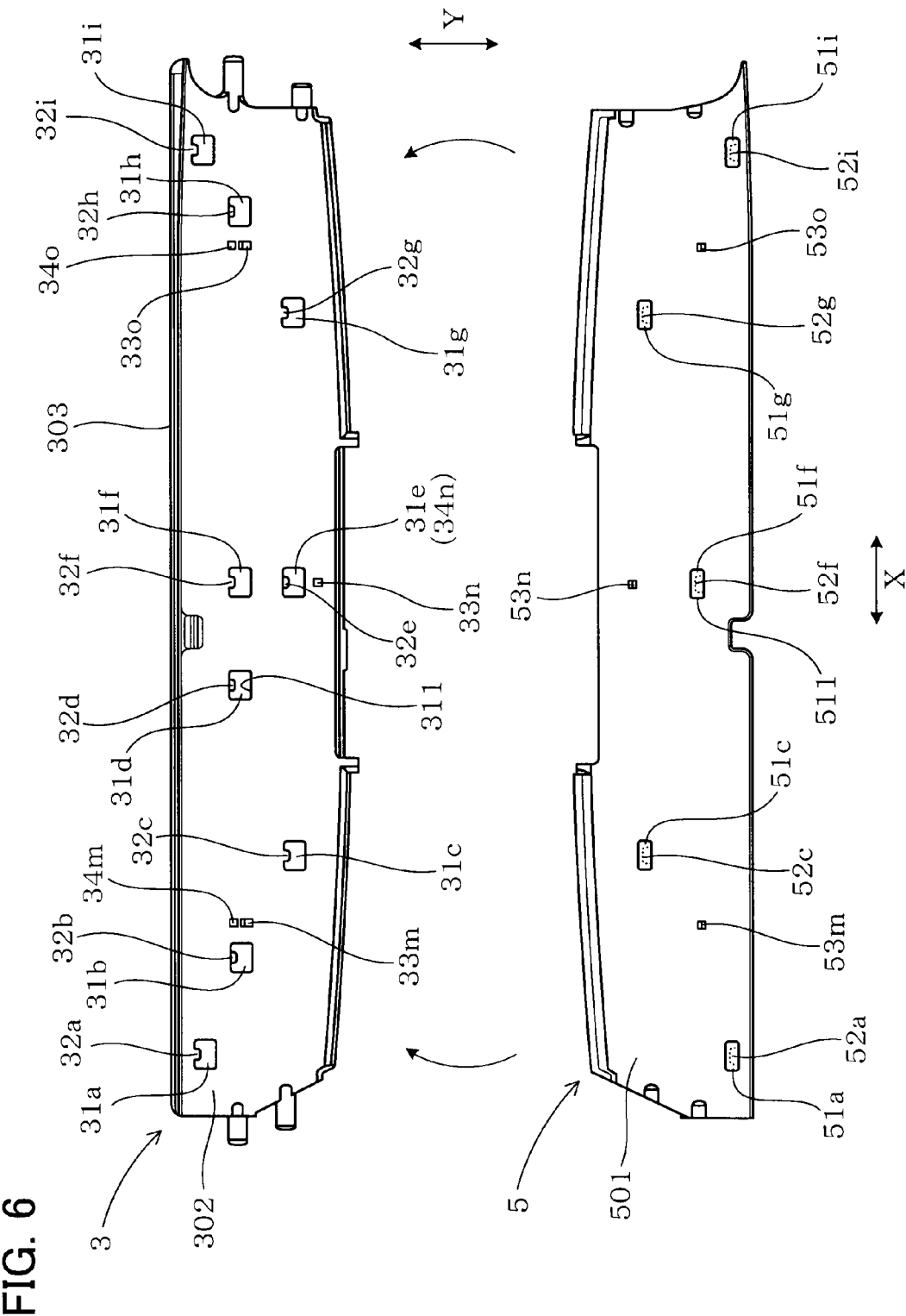
FIG. 6 is an illustration showing a second surface of the fin main body and an opposed surface of the second fin cover in the register according to the embodiment.

As shown in FIGS. 4 to 6, the fin main body 3 is provided with nine engaging holes 31 (31a to 31i) which pass through the fin main body 3 in the thickness direction Z. The engaging holes 31 (31a to 31i) are provided with engaging protrusions 32 (32a to 32i) which protrude from the inner wall face 31l thereof toward the hole center.

As shown in FIG. 5, on the first surface 301 of the fin main body 3, which faces the first fin cover 4, three locating concave portions 33 (33j to 33l) which are recessed in the thickness direction Z are disposed. At the forward positions of respective locating concave portions 33, the stopper concave portions 34 (34j to 34l) which are also recessed in the thickness direction Z are disposed.

As shown in the same drawing, on the first fin cover 4 which covers the first surface 301 side of the fin main body 3, four first engaging claws 41 (41b, 41d, 41e, and 41h) which protrude in the thickness direction Z from the surface 401 facing the first surface 301 of the fin main body 3 are disposed at the positions corresponding to the engaging holes 31 (31b, 31d, 31e, and 31h). The engaging claws 41 are provided with the engaging concave portions 42 (42b, 42d, 42e, and 42h) which are recessed inward from the outside surface 411 thereof.

In addition, on the first fin cover 4, three position control projecting portions 43 (43j to 43l) which project in the thickness direction Z from the facing surface 401 are provided at the positions corresponding to the locating concave portions 33 (33j to 33l) and the stopper concave portions 34 (34j to 34l).

As shown in FIG. 6, on the second surface 302 of the fin main body 3, which faces the second fin cover 5, three locating concave portions 33 (33m to 33o) which are recessed in the thickness direction Z are disposed. At the forward positions of respective locating concave portions 33, the stopper concave portions 34 (34m to 34o) which are also recessed in the thickness direction Z are disposed. In this embodiment, the engaging holes 31e also functions as the stopper concave portions 34n.

As shown in the same drawing, on the second fin cover 5 which covers the second surface 302 side of the fin main body 3, five second engaging claws 51 (51a, 51c, 51f, 51g, and 51i) which project in the thickness direction Z from the surface 501 facing the second surface 302 of the fin main body 3 are disposed at the positions corresponding to the engaging holes 31 (31a, 31c, 31f, 31g, and 31i). The engaging claws 51 are provided with the engaging concave portions 52 (52a, 52c, 52f, 52g, and 52i) which are recessed inward from the outside surface 511 thereof.

In addition, on the second fin cover 5, three position control projecting portions 53 (53m to 53o) which project in the thickness direction Z from the facing surface 501 are provided at the positions corresponding to the locating concave portions 33 (33m to 33o) and the stopper concave portions 34 (34m to 34o).

As shown in FIGS. 8(a) and (b), the fin main body 3 and the first fin cover 4 are assembled by engaging the engaging holes 31 (31b, 31d, 31e, and 31h) and the engaging claws 41 (41b, 41d, 41e, and 41h).

Specifically, the engaging protrusions 32 (32b, 32d, 32e, and 32h) of the engaging holes 31 are engaged with the engaging concave portions 42 (42b, 42d, 42e, and 42h) of the engaging claws 41. The position control projecting portions 43 (43j, 43k, and 43l) of the first fin cover 4 are located in the stopper concave portions 34 (34j, 34k, and 34l) of the fin main body 3 to restrict movement of the first fin cover 4 in the cross direction Y.

Similarly, the fin main body 3 and the second fin cover 5 are assembled by engaging the engaging holes 31 (31a, 31c, 31f, 31g, and 31i) and the engaging claws 51 (51a, 51c, 51f, 51g, and 51i), which is not shown in drawing.

Specifically, the engaging protrusions 32 (32a, 32c, 32f, 32g, and 32i) of the engaging holes 31 are engaged with the engaging concave portions 42 (42a, 42c, 42f, 42g, and 42i) of the engaging claws 41. The position control projecting portions 53 (53m, 53n, and 53o) of the second fin cover 5 are located in the stopper concave portions 34 (34m, 34n, and 34o) of the fin main body 3 to restrict movement of the second fin cover 5 in the cross direction Y.

The assembly process of the register fin 2 is described as follows.

In the assembly of the fin main body 3 and the first fin cover 4, as shown in FIGS. 7(a) and (b), the position control projecting portions 43 (43j, 43k, and 43l) of the first fin cover 4 are located in the locating concave portions 33 (33j, 33k, and 33l) of the fin main body 3, so that the engaging claws 41 (41b, 41d, 41e, and 41h) are inserted in the engaging holes 31 (31b, 31d, 31e, and 31h). As a result, the first fin cover 4 is positioned to the fin main body 3 in the longitudinal direction X.

Next, as shown in FIGS. 8(a) and (b), the first fin cover 4 is slid in the cross direction Y on the first surface 301 of the fin main body 3 to move the position control projecting portions 43 (43j, 43k, and 43l) from the inside of the locating concave portions 33 (33j, 33k, and 33l) to the inside of the stopper concave portions 34 (34j, 34k, and 34l). At this time, as shown in FIG. 8(b), the position control projecting portions 43 move over the first surface 301 of the fin main body 3 into the stopper concave portions 34 using the inclined portion 331 in the locating concave portions 33, so that the engaging protrusions 32 (32b, 32d, 32e, and 32h) of the engaging holes 31 are engaged with the engaging concave portions 42 (42b, 42d, 42e, and 42h) of the engaging claws 41. As a result, movement of the first fin cover 4 in the sliding direction (cross direction Y) is restricted.

As described above, the first fin cover 4 is assembled to the fin main body 3.

Similarly, in the assembly of the fin main body 3 and the second fin cover 5, which is not shown in drawing, the engagement control projecting portions 53 (53m, 53n, and 53o) of the second fin cover 5 are located in the locating concave portions 33 (33m, 33n, and 33o) of the fin main body 3, so that the engaging claws 51 (51a, 51c, 51f, 51g, and 51i) are inserted in the engaging holes 31 (31a, 31c, 31f, 31g, and 31i). As a result, the second fin cover 5 is positioned with respect to the fin main body 3 in the longitudinal direction X.

Next, the second fin cover 5 is slid in the cross direction Y on the second surface 302 of the fin main body 3 to move the position control projecting portions 53 (53m, 53n, and 53o) from the inside of the locating concave portions 33 (33m, 33n, and 33o) to the inside of the stopper concave portions 34 (34m, 34n, and 34o), so that the engaging protrusions 32 (32a, 32c, 32f, 32g, and 32i) of the engaging holes 31 are engaged with the engaging concave portions 52 (52a, 52c, 52f, 52g, and 52i) of the engaging claws 51. As a result, movement of the second fin cover 5 in the sliding direction (cross direction Y) is restricted.

As described above, the second fin cover 5 is assembled to the fin main body 3.

Next, the operation effects of the register for air-conditioning 1 according to this embodiment are explained.

In the register for air-conditioning 1 of this embodiment, the register fin 2 is formed of the plate-like fin main body 3 and the pair of plate-like fin covers 4 and 5 assembled so as to sandwich the fin main body 3 from both sides with the end face (front edge 303) on the fin main body 3 on the vehicle cabin side being exposed (see FIG. 4).

In other words, the register fin 2 is not a conventional one-piece unit but an assembly of a plurality of parts. The fin main body 3 has a portion facing the vehicle cabin (front edge 303) which is exposed and the other portions which are covered with the fin covers 4 and 5.

Therefore, according to this embodiment, the entire fin main body 3 can be painted in silver color without masking and then the fin covers 4 and 5 can be assembled to the fin main body 3 with the portion facing the vehicle cabin (front edge 303) being exposed. It enables to decorate only the portion facing the vehicle cabin where the design quality is requested most by painting in silver color and obtain the register fin 2 having a high design quality (see FIG. 2). In this way, the register fin 2 can be partially decorated.

In addition, the fin main body 3 and the fin covers 4 and 5 forming the register fin 2 have structures that allows them to be assembled by engaging the engaging holes 31 and the engaging claws 41 and 51 disposed respectively (see FIGS. 5 to 8). Therefore, the fin main body 3 and the fin covers 4 and 5 can be easily and surely assembled in a simple structure without use of glue, adhesive tape or the like. This also results in reduction of production cost.

In this embodiment, the fin main body 3 and the fin covers 4 and 5 are assembled by engaging the engaging protrusions 32 of the engaging holes 31 with the engaging concave portions 42 and 52 of the engaging claws 41 and 51 (see FIGS. 5 to 8). Therefore, the engaging holes 31, and the engaging claws 41 and 51 are surely engaged. As a result, the fin covers 4 and 5 can be firmly and surely assembled to the fin main body 3.

Figure 7:
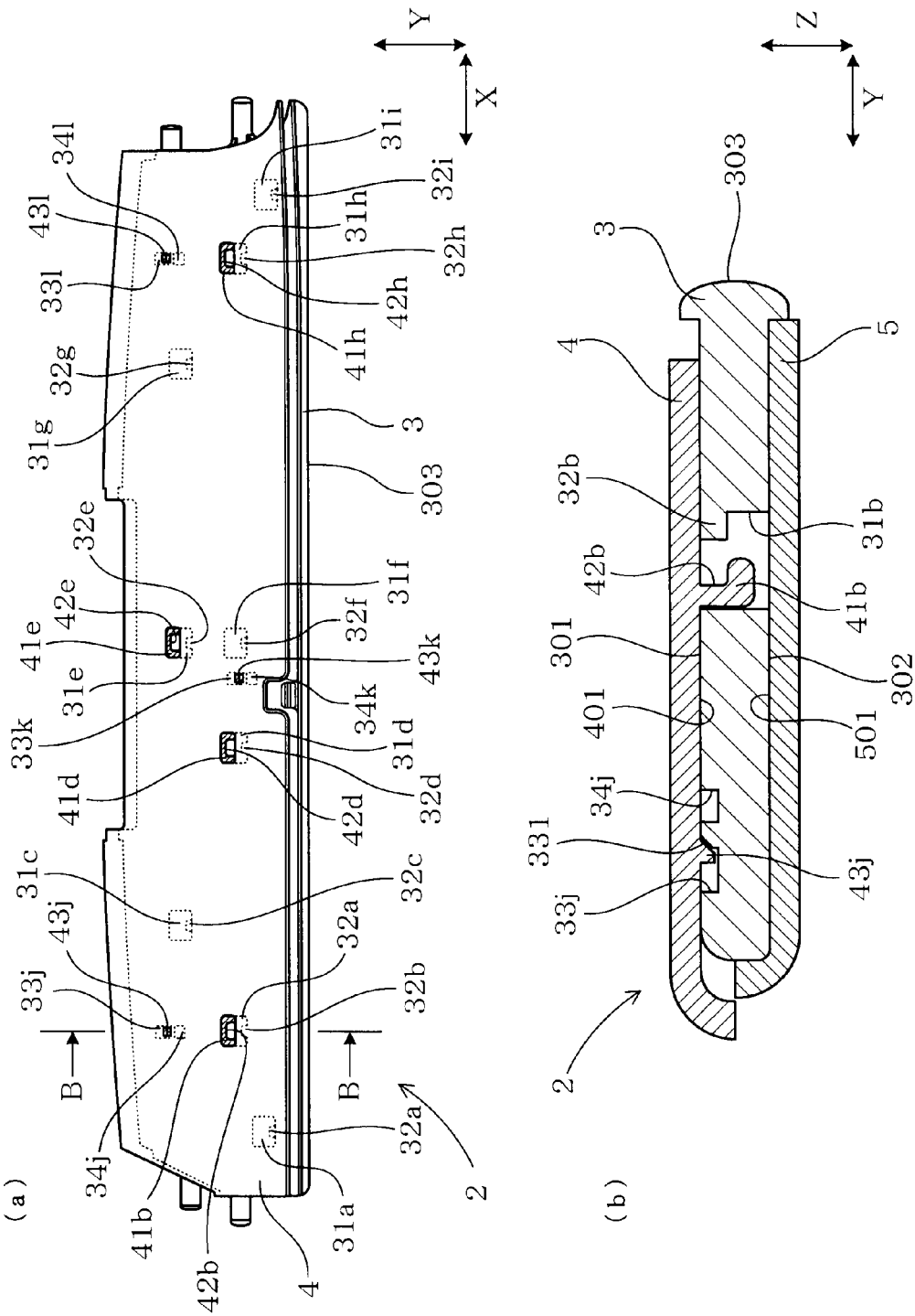
FIG. 7(a) is an illustration showing the process of assembling the first fin cover to the fin main body and FIG. 7(b) is a cross-section view taken along lines B-B of FIG. 7(a) in the register according to the embodiment.
Figure 8:
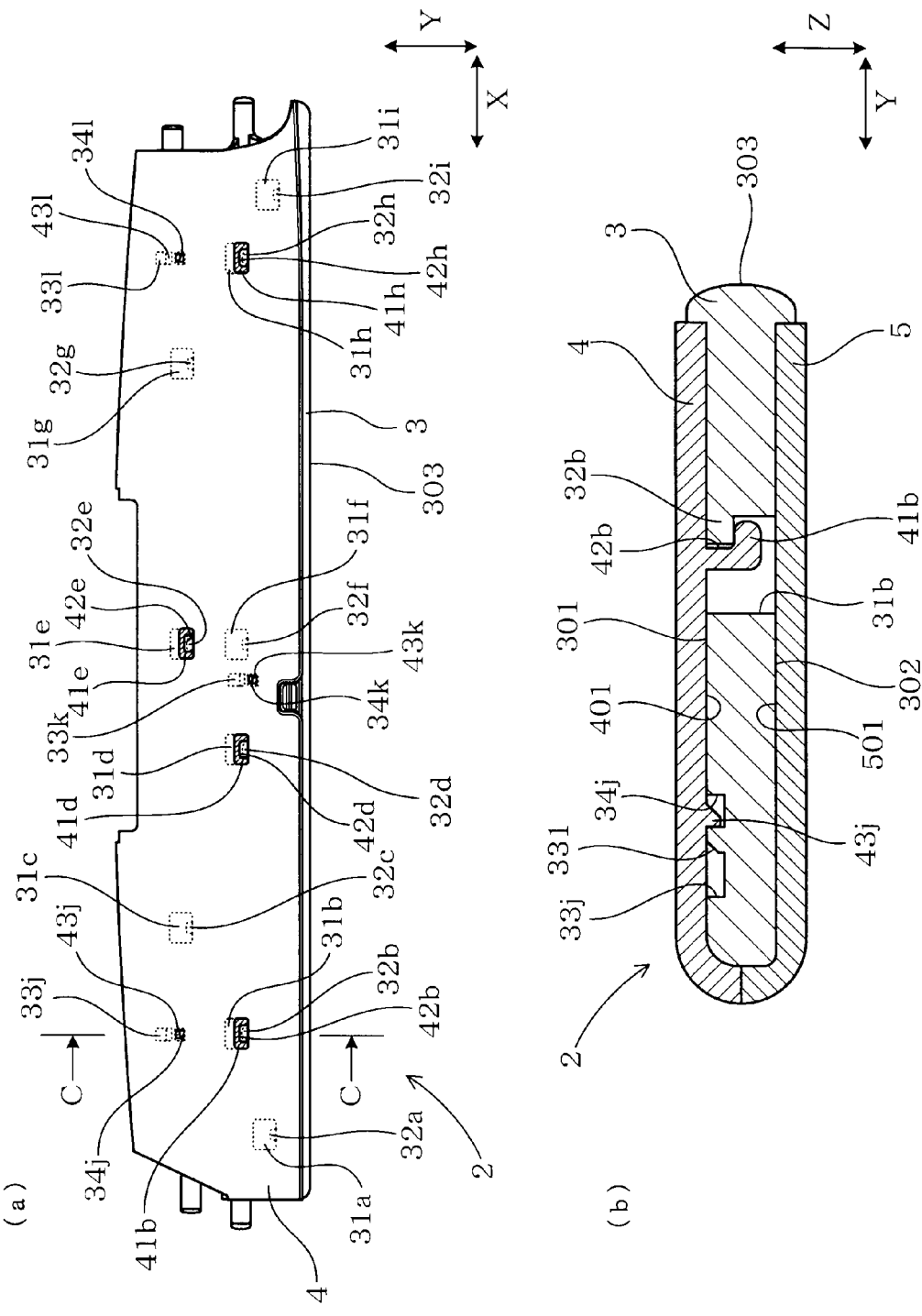
FIG. 8(a) is an illustration showing a state of the first fin cover assembled to the fin main body.
FIG. 8(b) is a cross-section view taken along lines C-C of FIG. 8(a), in the embodiment.

In addition, the fin main body 3 and the fin covers 4 and 5 are formed so that the engaging claws 41 and 51 are inserted in the engaging holes 31 and the fin covers 4 and 5 are positioned in the longitudinal direction X with respect to the fin main body 3 by locating the position control projecting portions 43 and 53 in the locating concave portions 33, and the engaging protrusions 32 of the engaging holes 31 are engaged with the engaging concave portions 42 and 52 of the engaging claws 41 and 51 and movement of the fin covers 4 and 5 in the sliding direction (cross direction Y) is restricted by sliding the fin covers 4 and 5 in the cross direction Y on the surfaces (first surface 301 and second surface 302) of the fin main body 3 and moving the position control projecting portions 43 and 53 from the inside of the locating concave portions 33 to the inside of the stopper concave portions 34 (see FIGS. 7 and 8). Therefore, the fin covers 4 and 5 can be easily assembled to the fin main body 3. In addition, during the assembly, the fin covers 4 and 5 can be easily positioned with respect to the fin main body 3. After the assembly, the positions of the fin covers 4 and 5 assembled to the fin main body 3 can be surely held.

Thus, according to this embodiment, the register for air-conditioning 1 having a simple structure and allowing partial decoration on the register fin 2 is provided.

The invention claimed is:

1. A register for air-conditioning comprising:
    a register main body having a tubular shape including
        an air passage through which conditioned air is passed, and
        a blowoff opening which is open toward a vehicle cabin side at a downstream end of the air passage and through which conditioned air blows; and
    at least one register fin disposed at the blowoff opening to regulate a wind direction of the conditioned air blowing out from the blowoff opening, the at least one register fin including
        a fin main body having a plate shape and including a plurality of engaging holes formed in a thickness direction thereof, and
        a pair of fin covers having a plate shape and being disposed so as to sandwich the fin main body from opposing sides thereof, such that an end face of the fin main body on the vehicle cabin side is exposed to the vehicle cabin side, the fin covers including a plurality of engaging claws disposed at corresponding positions thereon with respect to the engaging holes on the fin main body, and the engaging claws protruding in a thickness direction from surfaces of the fin covers that face the fin main body,
    wherein the fin main body and the fin covers are adjoined via engagement between the engaging holes and the engaging claws,
    wherein the pair of fin covers engages with the fin main body such that a vehicle cabin side peripheral end face of each fin cover abuts a back side of the exposed end face of the fin main body.

2. The register for air-conditioning according to claim 1, wherein
    the engaging hole includes an engaging protrusion protruding from an inner wall surface of the engaging hole,
    the engaging claw includes an engaging concave portion recessed inward from an outer surface of the engaging claw at the position corresponding to the engaging protrusion, and
    the fin main body and the fin covers are assembled by engaging the engaging protrusions of the engaging holes with the engaging concave portions of the engaging claws.

3. The register for air-conditioning according to claim 2, wherein the fin main body and the fin covers are configured so as to be assembled by inserting the engaging claws in the engaging holes and sliding the fin covers on the surface of the fin main body to engage the engaging protrusions of the engaging holes with the engaging concave portions of the engaging claws.

4. The register for air-conditioning according to claim 3, wherein
    the fin main body includes locating concave portions recessed in a thickness direction from the surfaces facing the fin covers and stopper concave portions located forward than the locating concave portions in a sliding direction of the fin covers,
    the fin cover includes position control projecting portions which project in a thickness direction from the surface facing the fin main body, and
    the fin main body and the fin covers are configured so that the engaging claws are inserted in the engaging holes and the fin covers are positioned in the longitudinal direction with respect to the fin main body by locating the position control projecting portions in the locating concave portions, and the engaging protrusions of the engaging holes are engaged with the engaging concave portions of the engaging claws and movement of the fin covers in the sliding direction is restricted by sliding the fin covers in the cross direction on the surfaces of the fin main body and moving the position control projecting portions from the inside of the locating concave portions to the inside of the stopper concave portions.

5. The register for air-conditioning according to claim 1, wherein the exposed end face of the fin main body is convex toward the vehicle cabin side and extends further than the pair of fin covers.

6. The register for air-conditioning according to claim 1, further comprising a rearward register fin disposed rearward of the at least one register fin within the air passage, the rearward register fin being oriented to extend longer in a vertical direction than in a horizontal direction.

7. The register for air-conditioning according to claim 6, wherein the at least one register fin is oriented to extend longer in a horizontal direction than in a vertical direction.

* * * * *